UNITED STATES PATENT OFFICE.

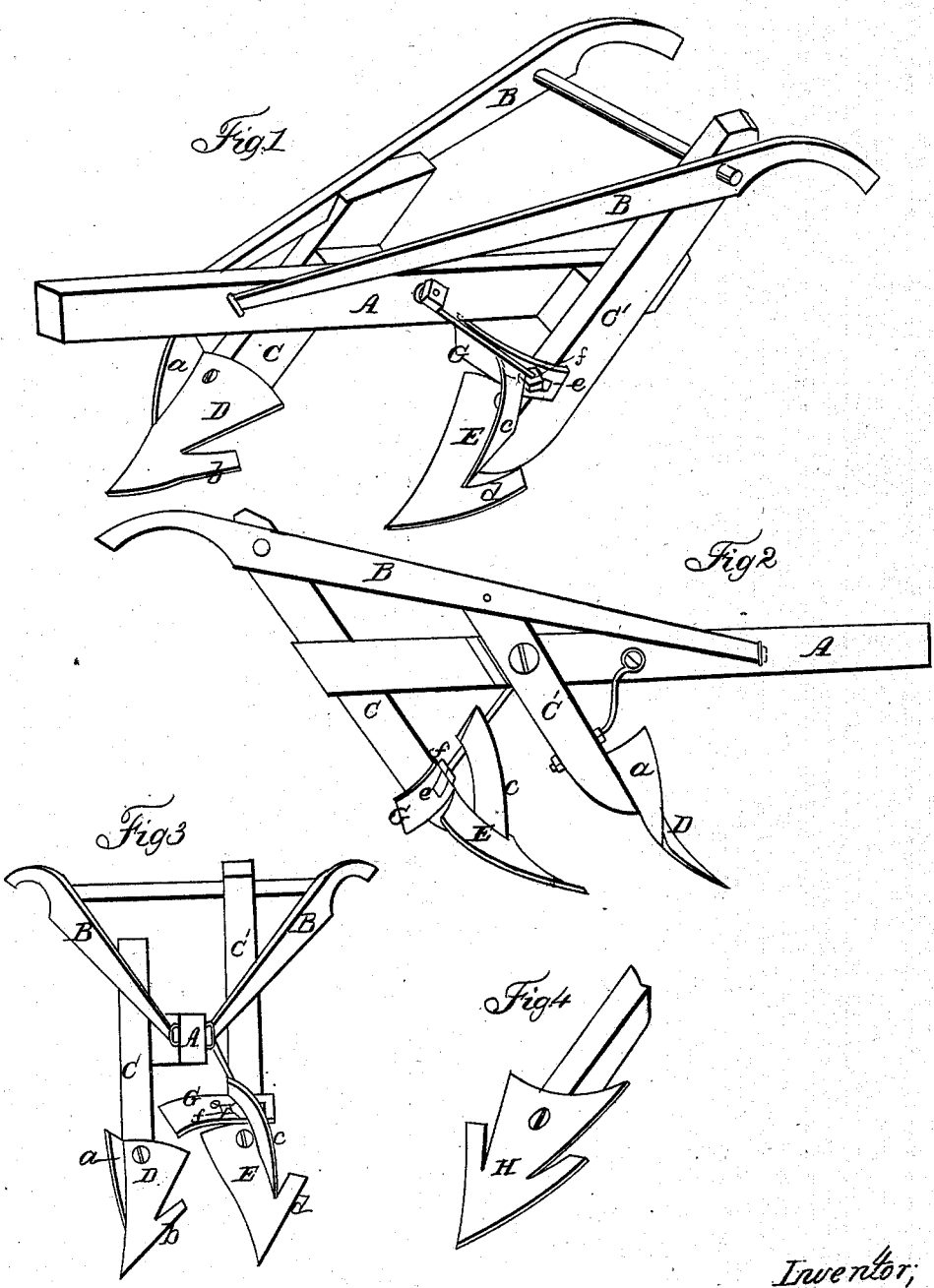

FRANCIS DAVIS, OF LIMA, OHIO.

IMPROVEMENT IN CULTIVATORS.

Specification forming part of Letters Patent No. 26,656, dated January 3, 1860.

*To all whom it may concern:*

Be it known that I, FRANCIS DAVIS, of Lima, in the county of Allen and State of Ohio, have invented a new and useful Improvement in Shovel-Plows; and I do hereby declare that the following is a full, clear, and exact description of the same, reference being had to the accompanying drawings, forming a part of this specification, in which—

Figure 1 is a perspective view of a double-shovel corn-plow constructed after my invention. Fig. 2 is a side view. Fig. 3 is a front view, and Fig. 4 is a modification of one of the shovels.

Similar letters of reference in each of the several figures indicate corresponding parts.

The nature of my invention consists in the particular arrangement of the several parts, as and for the purpose hereinafter described.

To enable others skilled in the art to make and use my invention, I will proceed to describe its construction and operation.

A is the beam; B B, the handles; and C C', the legs or standards, arranged on opposite sides of the beam, one behind the other.

D E are the shovels, secured fast on the legs. The shovel D has a vertical raised guard, *a*, on its right edge. On its left edge it is curved downward and constructed so as to have a wing, *b*. The shovel E is very similar in construction to the shovel D; but it has its right edge curved downward. From its left edge a guard, *c*, projects upward and laterally in a curved line toward the right. A wing, *d*, similar to the wing *b*, is formed on the left edge of the shovel E. At the top of the shovel E and on the leg C' of the plow a curved conductor, G, is arranged. This conductor forms a continuation, although not a part thereof, of the right curved edge of the shovel E, and may be set more or less to the right by means of a slot, *e*, and a set-nut, *f*, said slot being cut in the conductor G and the set-nut screwed on one of the brace-rods *f f* of the plow.

Instead of the shovel D, a shovel, H, similar to that represented by Fig. 4 of the drawings, may be used.

From the above description it will be seen that if the plow is used for cultivating very young plants it can be run close up to the roots, for the guard *a*, in combination with the left curved edge of shovel D, will cause the lumps and soil to fall to the right. The soil in thus falling will be mellowed by the wing *b* and then will be caught up by the shovel E, and while the lumps escape over the wings *d* the pulverized soil will be elevated and conducted through the agency of the guard *e* and the conductor G round the roots of the plants.

By having the conductor G adjustable the soil can be thrown higher or lower round the roots of the plants, and in case the shovels are set nearer together or farther apart it can be set so as to suit the adjustment.

In case the plow is used for cultivating plants of longer growth the shovel shown in Fig. 4 is substituted for D, so that the soil may be thrown directly around the plants. When the shovel, Fig. 4, is thus used the conductor is set in and shovel E simply closes up the furrow made by the shovel D.

If the plow with shovel H is used in plowing in wheat sown between corn, the conductor is set out to the right, so that the soil moved by the shovel D shall be thrown back upon the wheat in a manner to completely cover it.

What I claim as my invention, and desire to secure by Letters Patent, is—

The arrangement of the plow A B C C', shovel D or H, shovel E, guard *c*, and slotted adjustable conductor G, all in the manner and for the purposes set forth.

FRANCIS DAVIS.

T. E. CUNNINGHAM,
W. H. NICHOLS.